United States Patent Office 2,760,862

Patented Aug. 28, 1956

2,760,862

METHOD OF PRODUCING DUPLICATE COLOR POSITIVES BY MEANS OF A CONFORMED COLOR CORRECTED NEGATIVE

Harold C. Harsh, Binghamton, N. Y., assignor to General Aniline & Film Corporation, New York, N. Y., a corporation of Delaware No Drawing. Application August 19, 1953, Serial No. 375,305

2 Claims. (Cl. 95—2)

This invention relates to an improved process of producing duplicate multilayer color positive films by means of a conformed color corrected negative.

This application is a continuation-in-part of application Serial No. 58,615, filed November 5, 1948, now abandoned.

It is known that an original multilayer color positive film can be utilized as a master in making duplicate prints onto three separate black and white positive films by three printing steps while employing selected printing light, or directly onto a multilayer copying material of the reversal type.

One of the problems of employing a multilayer color positive film for motion pictures is the production of the so-called second generation prints or duplicates having satisfactory color saturation. In making high budget feature pictures, it is undesirable to depend upon the use of the original multilayer color positive film for printing the releases. In addition to the possibility of damaging the original film, which represents most of the producer's investment, during printing, modern feature pictures contain on the average of about 40% special effects which cannot be included conveniently or economically as a part of the release printing.

In black and white motion pictures, the usual practice is to use three printing steps, to wit: (1) a duplicate positive is made from the original negative, (2) a duplicate negative is printed from the duplicate positive, and (3) the release is printed either entirely from the duplicate negative or a conformed master which has the duplicate negative containing the special effects interspliced with the original negative.

Because of the inevitable limitations of all color processes, the rendition in a copy of a transparency is not always the same as the original transparency. The errors introduced in duplicating a transparency for a release print are of two kinds—(1) involving color rendition, (2) involving contrast, and (3) involving graininess and resolution. Errors of the first two types can be minimized by making a mask for the original transparency by printing it on a black and white film or plate. The mask is bound in contact with the original, the combination directly printed on a multilayer color film of the reversal type, and the film processed to a duplicate.

The conventional method of indirect reproduction from color transparencies necessitates the use of a set of color separation negatives made from the film. These separation negatives are converted into positives which, in turn, are used for the imbibition or dye toning printing of the release film. Serious problems of registration are encountered when using a duplicating method of the color separation type, and the final release prints are characterized by a serious lack of resolution and by a displeasing degree of unsharpness.

Whenever the customary black and white procedure is applied to the preparation of color release prints, the results are equally unsatisfactory for the following reasons. A photographic emulsion given a negative development appears to be inherently slower than the same emulsion processed by a reversal development because of the p-phenylenediamine type developer used in color negative development which has a lower reduction potential than the black and white developer used in the first development step of a reversal process. In order to overcome this undesirable loss of speed, one must use a negative taking emulsion of greater initial speed, sacrificing at the same time the fine grain structure for the more sensitive coarser silver grains. Consequently, the standard black and white procedure applied to the preparation of color pictures leads to color release prints displaying an undesirable great degree of graininess and lack of resolution.

It is an object of the present invention to provide an improved method of producing from an original transparency, positive release prints of excellent contrast, color brilliance and improved graininess and resolution.

Other objects will appear hereinafter.

I have found that the above objects are accomplished by utilizing as a conformed printing master, a fine grain color corrected negative. The method involved in making the conformed printing master and duplicate positive print consists of the following four steps:

(1) The original exposure is made on a multilayer color reversible film having a soft gradation. The gradient of this material may range from 1.4 to 1.7; a gradient between 1.5 and 1.6 is preferred. The image gradients of the color developed reversal transparency are also between 1.4 and 1.7, a range between 1.5 and 1.6 being preferred.

(2) A black and white color correction mask is printed from the original.

(3) The original transparency and black and white mask are printed together onto a fine grain color negative. Several identical negatives can be prepared which serve as conformed masters. The gradient of the fine grain color negative material ranges from 0.9 to 1.2, the preferred range being from 1.0 to 1.1. The image gradient of the negative is the product of the gradient of the negative material and the gradient difference of the transparency and the mask. Its numerical value is preferably between 1.0 and 1.1.

(4) The fine grain color corrected negative is printed onto a multilayer color film of the positive type for the release prints. The positive color film materials used may have a gradient ranging from 2.2 to 3.5 and a gradient between 2.8 and 3.0 is preferred. The image gradient of the positive release print is a function of the gradient of the intermediate image. More particularly, it is the product of the difference of the gradient of the reversal transparency and the mask, multiplied by the gradient of the negative and the positive as expressed by the following equation:

$$I_g=(G_t-G_m)\times G_n\times G_p$$

wherein $I_g$ is the image gradient of the finished projection positive; $G_t$ is the gradient of the reversal transparency; $G_m$ is the gradient of the mask; $G_n$ is the gradient of the negative; and $G_p$ is the gradient of the positive.

The image gradient of the positive release print, when measured in the linear or straight line portion of the curve, is between 2.5 and 3.5 or preferably between 2.8 and 3.2. This straight line portion generally lies between the densities of 1.0 and 3.0.

The photographic multilayer color film, which is employed in making the original exposure of step (1), is of the color reversible type irrespective of whether the dyestuff images are produced with the color formers incorporated in the emulsion or by a selective second exposure and color development wherein the color formers are added to the developing solution.

The multilayer color reversible film containing color formers is prepared according to the methods described in United States Patents 2,179,228, 2,179,239, 2,186,849 and 2,220,187, and consists of an integral tripack emulsion coated on the usual clear cellulose acetate or nitrate film base. Each of the emulsions is sensitized to one of the primary colors of light, namely, blue, green, and red. The top layer is blue sensitive. A filter layer, yellow in color and blue absorbing, lies under the top layer. Below this filter layer lies a green sensitive emulsion layer and below this is a red sensitive emulsion layer. Each of the three silver halide emulsion layers contains dye forming compounds which unite during the development of the silver image in an aromatic amino developing agent to form a dye with the oxidation product of the developing agent, or may be free from color formers in which case the film is processed with the color formers in the color developers by the selective second exposure and color development method as described in United States Patents 1,897,866, 1,900,870, 1,928,709, and 1,980,941.

A multicolor film in which each element bears a color yielding layer comprising a hydrophilic film forming synthetic polymer containing a plurality of hydroxyl groups and having a plurality of color components and, in addition, containing light sensitive silver salts as described in United States Patents 2,397,864, 2,397,865, 2,397,866, and 2,397,867, may also be employed in steps (1) and (4).

The film employed in making the black and white negative mask of step (2) is a panchromatic negative film commercially available for this purpose.

The black and white negative mask is produced by printing the transparency onto a panchromatic negative film in the usual way. The mask may be made and/or used so as to mask diffusely, i. e., unsharply rather than sharply. If the mask is printed by contact from a transparency it may be held slightly out of contact while the printing is done by a wide printing light.

Anyone of the several well known masking techniques may be employed. For practical purposes, a single mask is preferred. It is prepared by placing the emulsion side of the masking film in contact with the emulsion side of the transparency, and exposing the masking film through the transparency to monochromatic or substantially monochromatic light. The lines of the sodium spectrum may be used to provide monochromatic light, while a combination of filters (Wratten #23 and #56) may be used to provide substantially monochromatic light.

For purposes of the present invention, I prefer to employ a universal mask obtained by exposing the masking film through the transparencey to bichromatic light, as will be pointed out hereinafter.

The fine grain color negative film utilized in step (3) is made up in the same manner as the color reversible film utilized in step (1), but may contain a layer of clear gelatin between the red sensitive layer and the green sensitive layer.

The color positive film utilized in step (4) is made up in the same manner as the color reversible film utilized in step (1), with the exception that it has a steeper gradation, and may contain a red filter layer between the red sensitive emulsion and the green sensitive emulsion.

The following example will serve to specifically describe the invention as applied to a multilayer color positive film containing color formers. This example should not, however, be construed as limiting or restricting the present invention, but should be considered merely as illustrative.

A three-foot strip of 35 mm. multilayer color film of the reversal type, containing color formers and prepared according to United States Patents 2,179,228 and 2,179,-239, was exposed and processed as follows:

The film was first developed for 14 minutes at 68° F. in a developer of the following composition:

| | Gms. |
|---|---|
| Metol | 3 |
| Sodium sulfite | 50 |
| Hydroquinone | 6 |
| Sodium carbonate | 40 |
| Sodium thiocyanate | 2 |
| Potassium bromide | 2 |
| Water to make 1 liter. | |

The developed film was short stopped for 2 minutes in a bath of the following composition:

| | Gms. |
|---|---|
| Acetic acid | 10 |
| Sodium acetate | 20 |
| Water to make 1 liter. | |

The material was then hardened for 5 minutes in a 3% aqueous solution of potassium chrome alum, and washed in water for 3 minutes.

The washed film was given a second exposure for 3 minutes to the light of a No. 1 photoflood lamp 30 inches away from the film and color developed for 15 minutes in a developer of the following composition:

| | Gms. |
|---|---|
| Sodium sulfite | 2 |
| p-Aminodiethylaniline HCl | 4 |
| Sodium carbonate (monohydrate) | 67.5 |
| Potassium bromide | 1 |
| Water to make 1 liter. | |

The film was then short stopped for 1 minute, hardened for 3 minutes, and washed in water for 5 minutes; bleached for 10 minutes in an aqueous solution containing 6% potassium ferricyanide, 1.5% of potassium bromide, and 2% of a sodium phosphate-sodium bisulfate buffer; washed in water for 5 minutes, fixed for 5 minutes in a 20% aqueous hypo solution, washed in running water for an additional 5 minutes and then dried. The finished transparency had a gradient of 1.5.

A black and white color correction mask was printed from the dried color transparency in the following manner:

The emulsion side of a three-foot 35 mm. normal contrast panchromatic film was placed in contact with the emulsion side of the transparency and the exposure, which is roughly 4 to 8 seconds, made to a diffused light source from a 3200° K. lamp through a Wratten G (#15) filter between the light source and an opal glass diffuser. In order to obtain additional diffusion, the opal glass is placed between the light source and the color transparency. The distance from the light source and the color transparency and masking film is approximately four feet.

The 3200° K. lamp in an ordinary safelight housing emits predominantly white light ranging from about 400 mμ to about 700 mμ in the visible spectrum.

The Wratten G filter, which is a dark yellow in color, absorbs the ultraviolet, violet, blue, and most of the blue-green rays, and transmits a band ranging from the green to the red regions of the spectrum. This band includes all of the yellowish green, yellow-orange, and red light. The color of the light actually going through the transparency to the emulsion side of the masking film is yellow since it contains some green and all of the red regions of the spectrum.

The exposed masking film was developed in a black and white developer, such as above, for 3 minutes at 68° F. to a gamma of 0.5. If a mask with a gamma of 0.5 does not yield adequate contrast or color correction, a mask with a gamma between 0.3 and 0.7, preferably between 0.4 and 0.6 may be employed.

The mask and the transparency were visually registered and printed together, in an optical printer, onto a fine grain multilayer color film of the negative type having a gamma of 1.0. The exposed color negative film was processed in the following manner:

The film was color developed for 15 minutes in a developer of the following composition:

| | Gms. |
|---|---|
| Sodium hexametaphosphate | 1 |
| Sodium bisulfite | 1 |
| p-Aminodiethylaniline HCl | 3 |
| Sodium carbonate (monohydrate) | 60 |
| Hydroxylamine HCl | 1 |
| Potassium bromide | 1.5 |
| Water to make 1 liter. | |

The developed film was short stopped for 3 minutes in a bath of the following composition:

| | |
|---|---|
| Sodium acetate gms | 20 |
| Acetic acid cc | 10 |
| Water to make 1 liter. | |

The short-stopped film was hardened for 5 minutes in a 3% aqueous solution of potassium chrome alum. At this point white light was turned on.

After washing for 5 minutes in running water, the film was treated in a bleach bath of the following composition:

| | Gms. |
|---|---|
| Di-potassium mono-sodium ferricyanide | 60 |
| Potassium bromide | 15 |
| Disodium phosphate | 13 |
| Sodium bisulfate | 6 |
| Water to make 1 liter. | |

The developed material was washed for 5 minutes and then fixed for 3 minutes in a solution of the following composition:

| | Gms. |
|---|---|
| Hypo | 200 |
| Borax | 10 |
| Water to make 1 liter. | |

After fixing, the film was washed for 10 minutes in running water, and allowed to dry. It has an image gradient of 1.0.

The fine grain color corrected negative is printed in a printer onto a multilayer color film of the positive type having a gradient of 3.0 and processed in the same manner as described above for the multilayer color negative film. The finished picture has an image gradient of 3.0.

The positive print thus obtained is a satisfactory reproduction of the original scene, and shows good color rendition and contrast on projection. The resolution of the release print and with it, the apparent sharpness, is superior to those obtainable by any of the more conventional methods.

While I have herein disclosed the preferred embodiments of my invention, I do not desire to limit myself solely to the foregoing illustrative example, since it will be readily apparent to those skilled in the art that the foregoing procedural steps may be varied and other similar steps and processing solutions employed without departing from the spirit and scope thereof. As for example, instead of preparing a separate negative mask from the original transparency, the emulsion side of a panchromatic stripping film layer may be laminated to the support side of the original color transparency. After exposure, development and fixing, the masked original may be used in preparing the color corrected negative. Obviously, the practice of the present invention is not limited to the employment of the corrective mask in a separate black and white film. The masking image may form an integral part of the original transparency and may be prepared according to various procedures, such as those described in United States Patents 2,203,652, 2,203,653, or 2,253,070. Integrally masked transparencies may also be produced by the use of azo substituted color formers described in Heimbach and Morreall's United States patent application Serial No. 593,144 filed May 11, 1945, now abandoned. Similarly, the processed multilayer color negatives may contain an integral masking image which may be prepared, for example, according to the methods described in United States Patents 2,357,388 and 2,431,996, or in the aforestated Heimbach and Morreall patent application. Accordingly, therefore, only such limitations should be imposed as are indicated in the following claims.

I claim:

1. The method of producing a subtractive multicolor positive print, of satisfactory color rendition and contrast for projection purposes, from a subtractively multicolored positive transparent original having an image gradient between 1.5 and 1.6, which comprises placing the positive in registry with a negative silver color correction mask prepared by exposing a black and white film through said positive original with light having a continuous band ranging from the green to the red regions of the spectrum and developing said black and white film to a gradient between 0.4 and 0.6, printing the said masked original onto a fine grain multicolor negative film having superimposed silver halide emulsions, the innermost of which is sensitized for red and contains a color former for producing a cyan image, the intermediate layer of which is sensitized for green and contains a color former capable of producing a magenta image, and the outermost layer of which is sensitized for blue and contains a color former capable of producing a yellow image, processing said negative film by development in a primary aromatic amino color developer, bleaching and fixing the same to a color corrected negative having an image gradient between 1.0 and 1.1, printing the color corrected negative onto a multilayer color positive film having a gradient between 2.8 and 3.0, and processing the printed positive film by color development to a subtractively multicolored positive print having an image gradient between 2.8 and 3.2.

2. The method of producing a subtractive multicolor positive print of satisfactory color rendition and contrast for projection purposes which comprises reproducing an original scene on a subtractively multicolored reversal positive transparency having an image gradient between 1.5 and 1.6, placing the transparency in registry with a negative silver color correction mask prepared by exposing a black and white film through said positive original with light having a continuous band ranging from the green to the red regions of the spectrum and developing said black and white film to a gradient between 0.4 and 0.6, printing the said masked original onto a fine grain multicolor negative film having superimposed silver halide emulsions, the innermost of which is sensitized for red and contains a color former for producing a cyan image, the intermediate layer of which is sensitized for green and contains a color former capable of producing a magenta image, and the outermost layer of which is sensitized for blue and contains a color former capable of producing a yellow image, processing said negative film by development in a primary aromatic amino color developer, bleaching and fixing the same to a color corrected negative having an image gradient between 1.0 and 1.1, printing the color corrected negative onto a multilayer color positive film having a gradient between 2.8 and 3.0, and processing the printed positive film by color development to a subtractively multicolored positive print having an image gradient between 2.8 and 3.2.

References Cited in the file of this patent

UNITED STATES PATENTS

| | | |
|---|---|---|
| 2,203,652 | Ehrenfried | June 4, 1940 |
| 2,203,653 | Evans | June 4, 1940 |
| 2,294,981 | Hanson | Sept. 8, 1942 |
| 2,382,690 | Yule | Aug. 14, 1945 |

FOREIGN PATENTS

| | | |
|---|---|---|
| 475,784 | Great Britain | Nov. 22, 1937 |
| 475,786 | Great Britain | Nov. 22, 1937 |
| 512,608 | Great Britain | Sept. 21, 1939 |